United States Patent [19]

Strong

[11] 3,948,881

[45] Apr. 6, 1976

[54] PROCESS FOR THE PRODUCTION OF ALKYLENE GLYCOL ALGINATES

[75] Inventor: Clifford H. G. Strong, Guelph, Canada

[73] Assignee: Uniroyal, Ltd., Canada

[22] Filed: Oct. 25, 1974

[21] Appl. No.: 518,126

[30] Foreign Application Priority Data
July 16, 1974 Canada .................................. 204887

[52] U.S. Cl. .............................................. 260/209.6
[51] Int. Cl.² ........................................ C08B 37/04
[58] Field of Search ................................ 260/209.6

[56] References Cited
UNITED STATES PATENTS

| | | | |
|---|---|---|---|
| 1,814,981 | 7/1931 | Thornley et al. | 260/209.6 |
| 2,036,922 | 4/1936 | Clark et al. | 260/209.6 |
| 2,036,934 | 4/1936 | Green | 260/209.6 |
| 2,128,551 | 8/1938 | Le Gloahec et al. | 260/209.6 |
| 2,426,125 | 8/1947 | Steiner | 260/209.6 |
| 2,494,911 | 1/1950 | Steiner et al. | 260/209.6 |
| 2,494,912 | 1/1950 | Steiner et al. | 260/209.6 |
| 3,300,473 | 1/1967 | Christoffel et al. | 260/209.6 |
| 3,396,158 | 8/1968 | Haug | 260/209.6 |
| 3,772,266 | 11/1973 | Pettitt et al. | 260/209.6 |

FOREIGN PATENTS OR APPLICATIONS

| | | | |
|---|---|---|---|
| 676,618 | 7/1952 | United Kingdom | 260/209.6 |

*Primary Examiner*—Ronald W. Griffin
*Attorney, Agent, or Firm*—Robert J. Patterson

[57] ABSTRACT

An improved process for the production of alkylene glycol alginates from seaweeds of the Class Phaeophyceae by treating with a dilute aqueous solution of a strong acid, washing the solid residue, optionally but preferably neutralizing only part of the free alginic acid in the washed residue with an alkaline agent, esterifying the unisolated alginic acid in situ in the solid seaweed residue with an alkylene oxide, and recovering the alkylene glycol alginate so formed from the resulting reaction mixture.

24 Claims, 2 Drawing Figures

PROCESS FOR THE PRODUCTION OF ALKYLENE GLYCOL ALGINATES

BACKGROUND OF THE INVENTION

1. Field of the Invention

This invention is concerned with preparing alginic acid esters known as "alkylene glycol alginates" by a procedure for treating seaweeds of the Class Phaeophyceae. This novel and improved process involves treatment of the seaweed with an acid and thereby forming alginic acid therein and subsequently reacting the alginic acid content of the treated seaweed, with an alkylene oxide to form an alkylene glycol alginate in situ without prior isolation of alginic acid or its salts from the solid seaweed residue.

2. Description of the Prior Art

Alginic acid is a polyuronic acid generally believed to consist of two uronic acids; mannuronic acid and guluronic acid, the proportions of which vary depending on factors such as, for example, seaweed species, plant age and seasonal variation. Alginic acid in the form of mixed water insoluble salts, in which the principal cation is calcium, is present in seaweeds of the Class Phaeophyceae, typical examples of which are: *Fucus vesiculosus, F. spiralis, Ascophyllum nodosum, Macrocystis pyrifera, Alaria esculenta, Laminaria longicruris, L. digitata, L. saccharina, and L. cloustoni.*

Methods for the recovery of water insoluble alginic acid and its water soluble salts, particularly sodium alginate, are well known. The first extraction process was patented by Stanford in British Pat. No. 142 (1881). A series of variations of Stanford's method have subsequently been described in the patent literature. The most recent and familiar are the processes of Green, U.S. Pat. No. 2,036,934, and Le Gloahec and Herter, U.S. Pat. No. 2,128,551.

In Green's process, seaweeds of the Class Phaeophyceae are treated with dilute acid, such as dilute hydrochloric acid, followed by water washing. This converts the natural alginate salts present to alginic acid. Salts, residual hydrochloric acid, and water soluble organic materials are then removed by washing. The pretreated seaweed is then chopped or milled and an excess of sodium carbonate added together with a quantity of water to extract the water soluble sodium alginate formed. The mixture is filtered to recover the clarified sodium alginate solution to which a solution of calcium chloride is added to precipitate the alginate in the form of water insoluble calcium alginate. The highly hydrated precipitate is separated from the solution of sodium chloride, excess calcium chloride, and soluble color bodies, particularly phenolic compounds, usually present in the original extract. The precipitate may still retain some color bodies, even after water washing, and calcium hypochlorite is added as a bleaching agent. The precipitate is then treated with dilute hydrochloric acid to convert the purified calcium alginate to alginic acid. This gelatinous precipitate is washed with water to remove excess hydrochloric acid and calcium salts. It may be neutralized to provide the purified sodium alginate of commerce.

In the Le Gloahec and Herter process, seaweeds of the Class Phaeophyceae are treated with a solution of calcium chloride and the water soluble components of the seaweed are then extracted and removed by draining. The seaweed is then treated with dilute hydrochloric acid, drained, and water washed. Sodium carbonate is added and the seaweed mixture milled and diluted with water to extract the sodium alginate. The slurry is aerated to separate insoluble materials by a method of air flotation and the residual clarified solution is treated with a decolorizing agent. The purified sodium alginate could then be recovered by conventional means, as for example, by alcohol precipitation. To recover alginic acid, the solution is treated with dilute sulfuric acid, the precipitate being separated and pressed to remove the aqueous solution containing sodium sulfate and excess sulfuric acid. The precipitate is dehydrated with alcohol, washed with further quantities of alcohol, and then dried to produce the alginic acid of commerce.

Methods for preparing alkylene glycol alginates are also described in the patent literature. Steiner in U.S. Pat. No. 2,426,125 discloses a method for the manufacture of glycol alginates followed subsequently by Steiner et al in U.S. Pat. Nos. 2,494,911 and 2,494,912, Nielsen et al in Canadian Pat. No. 904,847, and Pettitt et al. in their related disclosures in Canadian Pat. No. 942,744 and U.S. Pat. No. 3,772,266. All of these patents describe, with variations in procedure, methods by which alkylene oxides are reacted with alginic acid.

The prior art teaches the preparation of glycol alginates by the reaction of alkylene oxides with the alginic acid produced by methods known in the art, such as those described above or those mentioned by Steiner in U.S. Pat. No. 2,426,125, viz. U.S. Pat. Nos. 1,814,981 to Thornley et al., 2,036,922 to Clark et al. and 2,036,934 to Green. It will be noted that Steiner U.S. Pat. No. 2,426,125 states (column 3, lines 3–6) "that the free acid from the above or other modifications of the general method may be used for my purpose provided only that the acid be in a state of commercial purity". The wet alginic acid is typically partially dried so as to contain approximately 50% by weight of water. This acid is milled to provide a large surface area; and either before, during, or after the drying process, it is partially neutralized with any suitable base so that between 5 and 30% of the carboxyl groups of the acid are combined with the base. It is essential that the base used be thoroughly disseminated through the acid so as to avoid the possibility of part of the acid being completely neutralized, and thus rendered unsuitable for the esterification reaction, while some of the acid remains free of partial neutralization. For this reason, Steiner describes several methods of partial neutralization. For example the base may be dispersed in a quantity of low boiling alcohol or ketone and added as a slurry to the stirred, wet, milled alginic acid. A wetting agent may also be added to aid dispersion.

Steiner's partially neutralized, finely divided, alginic acid is reacted with an alkylene oxide such as ethylene oxide or propylene oxide (1,2-epoxypropane). In commercial practice, the preferred glycol alginate is propylene glycol alginate formed by reaction of alginic acid with propylene oxide. The reaction proceeds with both the formation of the glycol alginate, and hydrolysis of the alkylene oxide due to the presence of water and the low pH of the mixture. Thus, a greater quantity of the alkylene oxide than the stoichiometric equivalent is required. It is believed that molar ratios of between 2:1 and 3:1 alkylene oxide: alginic acid are used, although Nielsen et al in Canadian Pat. No. 904,847 state (page 9, lines 17–18) that "the amount of propylene oxide may be from 1 mol to about 25 moles per mol alginic acid." In Nielsen's case, the reaction is carried out in a diluent, such as an alcohol or ketone, and a substantial portion of the oxide is thus not consumed in the esterification reaction. It is generally recognized that complete reaction of oxide and available carboxyl groups is not only difficult, requiring the use of large quantities of alkylene oxide, but unnecessary.

Said Pettitt et al patents disclose partly neutralized alginic acid of critical 65–78% solids content reacting with propylene oxide gas in the absence of air in 3 hours or less at 60°–100°C. In the examples, the oxide : acid molar ratios range from 2.8:1 to 15:1.

Wallerstein et al. in U.S. Pat. No. 2,478,988 teach the use of propylene glycol alginate as a foam stabilizing agent. According to Steiner U.S. Pat. No. 2,659,675, the glycol alginate used for the purpose of the Wallerstein patent was designed for use as an emulsifying agent in French dressings and the like and had the analysis: neutralization as ammonium alignate 30 to 40%; esterification 25 to 40%; and unreacted acidity 20 to 45%. In the same patent, Steiner teaches that an improved foam stabilizing agent has the following characteristics among others: neutralization as sodium alginate 15 to 20%; esterification 65 to 80%; and unreacted acidity 5 to 15%. Therefore, depending on the end use of the glycol alginate product, it appears that a fully satisfactory product may have any of the following characteristics: neutralization of between about 5 to 40% with any suitable base or mixture of bases; esterification of from about 25 to 80%; and unreacted acidity of from about 5 to 45%. In general the glycol alginate should be completely soluble in water giving a solution the pH of which is not less than about 3.5. Storage stability of the dry product may be impaired if the pH of its aqueous solution is below 3.5.

From the above description of the prior art, it is quite evident that prior art techniques for the preparation of glycol alginates have involved formation of alginic acid, separation thereof from seaweed residue and subsequent esterification of the alginic acid to produce the glycol alginate and have been rather complex, slow and costly in terms of chemical and processing requirements. Of the procedures described, the initial preparation of alginic acid appears the most complex, although separating the alginic acid in a form considered to be suitable for esterification, as described earlier, also appears to require a great deal of care and attention.

It has now been discovered that, contrary to previous belief, the alginic acid used for reactions, such as the esterification reaction described above, need not be in the extracted state of commercial purity. In other words, the present invention is based on the discovery that it is not necessary to isolate the alginic acid from the solid residue of the precursor seaweed in order to react the alginic acid with an alkylene oxide. In addition, the glycol alginate products of my novel process are capable of meeting the various commercial requirements and specifications such as those outlined above, together with color, purity, etc.

SUMMARY OF THE INVENTION

The present invention relates to a process of making alkylene glycol alginates from seaweed of the Class Phaeophyceae which comprises treating said seaweed with an aqueous solution of a strong acid to form alginic acid in the treated seaweed, separating the acid treated seaweed from the aqueous acidic solution, washing the separated seaweed with water to remove residual treating acid and water soluble components therefrom, reacting the alginic acid content of the resulting treated seaweed in situ with an alkylene oxide without prior separation or isolation of said alginic acid from the solid residual treated seaweed, and recovering alkylene glycol alginate from the resulting reaction product. In an optional but preferred embodiment, the unextracted free alginic acid in the acid treated and washed seaweed is partially neutralized with an alkaline agent prior to reaction with the alkylene oxide.

Other aspects of the invention are concerned with preferred or special embodiments or conditions including the selection of treating acids and the degree of partial neutralization of the acid treated seaweed, the moisture content of the seaweed charged to the esterification reaction, as well as optional treatments with buffering agents or formaldehyde.

More specifically, the treating acid may be hydrochloric, sulfuric, phosphoric or nitric acid, hydrochloric and nitric acids being preferred. This strong acid may be employed in the form of a dilute aqueous solution typically containing between about 1 and 5% by weight of the active or 100% acid. The amount of acid (calculated as 100% acid) is preferably between about 10 and 50% by weight of the seaweed (dry) being treated. The acid treated seaweed may be water washed and partially neutralized with an alkaline agent (preferably sodium bicarbonate) which is best added to the final wash water used to remove the treating acid from the acid treated seaweed. The amount of such alkaline agent may be adjusted to neutralize about 5–40% of the carboxyl groups in the alginic acid content of the acid treated seaweed. The water content of the acid treated seaweed may be reduced to about 13–40% by weight based on the weight of the treated seaweed, prior to subjecting the latter to esterification with the alkylene oxide. The esterification reaction may be carried out with a molar ratio of alkylene oxide to alginic acid content of the treated seaweed of between about 1:1 and 3:1 and at a temperature of about 45° to about 65°C for a period of 2 to 8 hours, preferably at about 55°C for a period of 4 hours at atmospheric pressure. The acid treated water washed seaweed may also be treated with a dilute (1–2% by wt.) aqueous formaldehyde solution prior to the neutralizing step, and of course prior to the esterification step, to increase the degree of esterification and the yield of alkylene glycol alginate.

Numerous objects, advantages and benefits of this invention will be readily apparent to those skilled in the art upon consideration of the detailed disclosure hereinafter.

DESCRIPTION OF THE DRAWINGS

The drawings show the effects of water content and neutralization of the carboxyl groups of unextracted alginic acid in the seaweed on the esterification reaction with propylene oxide.

DESCRIPTION OF SPECIFIC EMBODIMENTS

Figure 1:
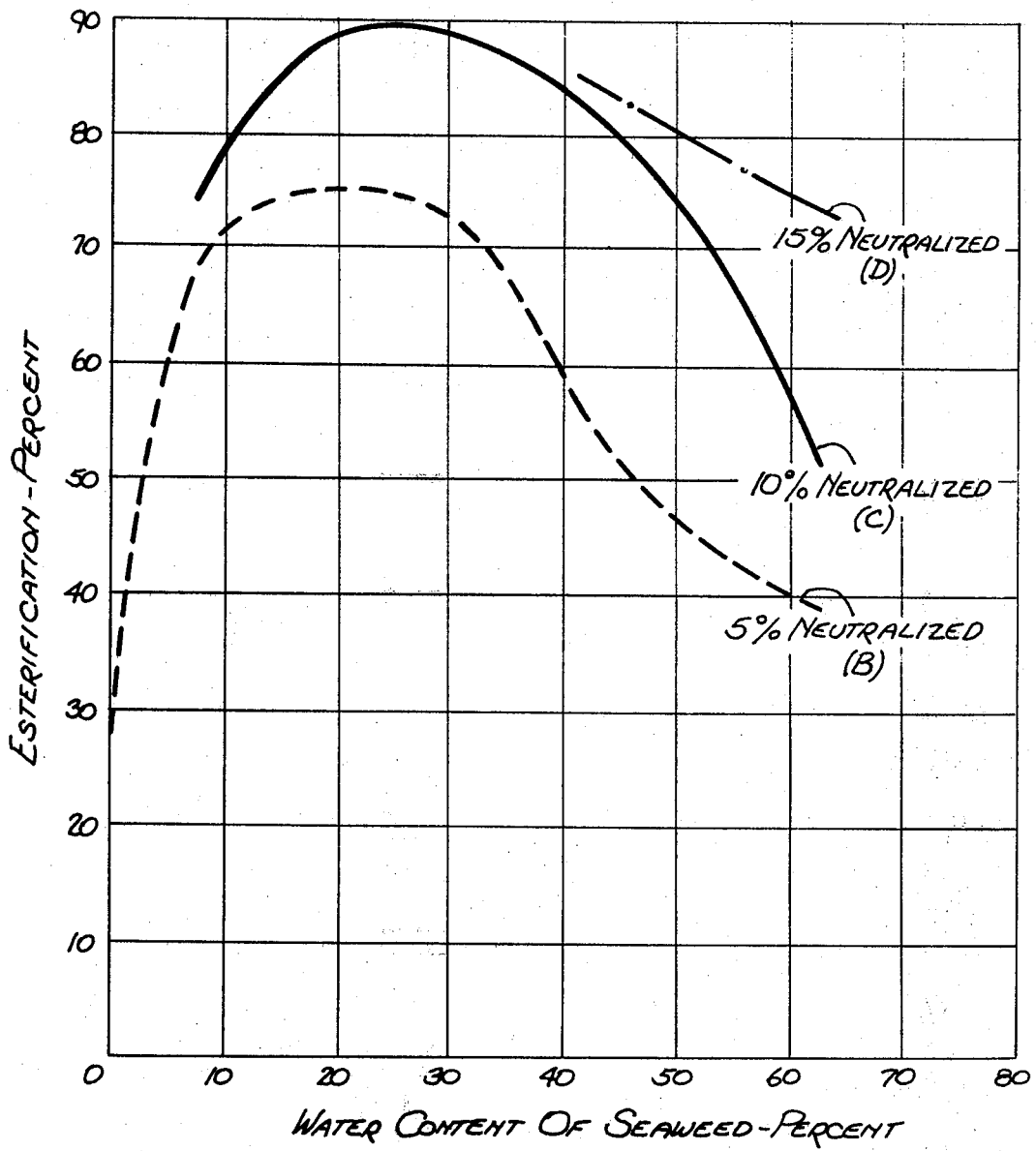
FIGS. 1 and 2 illustrate the degrees of esterification obtainable under the conditions described in Examples 1 and 3 respectively.

The present invention is based in part on the discovery that when seaweeds of the Class Phaeophyceae are treated with a dilute solution of a strong acid, the natural alginate salts are converted, within the seaweed structure to insoluble alginic acid. At the same time, water soluble inorganic materials therein, such as salts from the seawater and other salts resulting from the acid treatment, together with water soluble organic compounds, such as laminarin and mannitol, are extracted predominantly during the acid treatment, and more or less completely during one or more subsequent fresh water treatments. Thus a wet mixture of seaweed residues containing alginic acid virtually free from water soluble impurities is produced.

The invention is further based on the surprising discovery that the alginic acid contained in the resulting seaweed residues can be converted in situ, i.e. without the separation or isolation and purification thereof heretofore thought by prior workers to be essential, directly to alkylene glycol alginate by esterification with any appropriate alkylene oxide, that this esterification proceeds in a simple and straightforward manner, giving excellent conversion of the alginic acid content of the seaweed residue to alkylene glycol alginate, and that the alkylene glycol alginate so formed can be readily recovered in a form meeting the requirements and specifications of the industry.

In addition to the alginic acid and water contents of the acid treated and water washed seaweed, another substantial constituent thereof is a cellulose-like structural material containing small amounts of pigments, fats, proteins, and phenolic compounds. One would expect that these constituents would interfere with reactions involving the alginic acid, such as for example, reactions with alkylene oxides. Unexpectedly however, it has been discovered that this is not the case, and that under suitable conditions, the unextracted alginic acid may be esterified with results as good as, if not somewhat better than, the reaction of the alkylene oxide with alginic acid of commercial purity. Thus, while Steiner et al. in U.S. Pat. No. 2,494,911, Table 5, report a maximum esterification of 83% using a molar ratio of oxide to acid of 3:1, values of 85 to 89% have been obtained in the present process for the same oxide to acid ratio, but with shorter reaction times and with a lower percentage (e.g. 5%) of carboxyl groups of the acid neutralized prior to esterification. A glycol alginate product, which meets all the requirements and specifications referred to previously, is thus attained. While the aforesaid Pettitt et al. patents also mention high degrees of esterification, they were obtained under somewhat different reaction conditions.

In the practice of the present invention seaweeds of Class Phaeophyceae are acid treated and water washed to produce a seaweed residue containing unextracted alginic acid free from water soluble components. For the acid treatment, strong acids (i.e. those capable of a high degree of ionization) in general may be used in dilute solution with due attention to cost and to toxicity where edible alginate products are contemplated. Mineral acids including hydrochloric, sulfuric, phosphoric and nitric acids are particularly suitable. Hydrochloric and nitric acids are slightly preferred since the chlorides and nitrates of the natural cations associated with the alginic acid in the seaweed are more soluble in water than the sulfates, such as calcium sulfate. The quantity of acid used, and the treatment time should be such as to obtain complete conversion of alginates to alginic acid, and extraction of water soluble components of the seaweed. An acid treatment of about 1 to 2 hours at a temperature of about 10° to 30° C with an acid concentration of about 1 to 5% by weight in water has been found to be quite satisfactory for general use; and these ranges are illustrative rather than limiting. There may, however, be exceptions to the above conditions if, for example, the products derived from alginic acid are required to have a low degree of polymerization. In this case, controlled depolymerization of the alginic acid may be achieved by increasing the temperature, concentration and/or duration of the acid treatment.

The acidic solution is drained from the seaweed and the residue is washed one or more times with warm or cold water to remove residual acid and water soluble components present in the wet seaweed. In general 2 to 3 water washes of adequate volume, each for about 5 to 15 minutes, are sufficient.

As in the case with extracted alginic acid according to Steiner et al. in U.S. Pat. No. 2,494,911 as well as Pettitt et al. in U.S. Pat. No. 3,772,266, the esterification reaction between unextracted alginic acid and an alkylene oxide has been found to proceed more readily if a proportion of the carboxyl groups of the alginic acid is neutralized prior to reaction. However, unlike the Steiner and Pettitt processes, in the preferred practice of the present invention partial neutralization of the unextracted alginic acid is readily accomplished, for example by adding the required amount of a suitable alkaline agent in the form of an aqueous slurry or solution to the final wash water, whereby with mixing, the alkaline substance is completely dispersed throughout the seaweed mass.

The quantity of alkaline material added is varied depending on the required characteristics of the glycol alginate product and may be such as to neutralize from about 5 to about 40% of the carboxyl groups in the alginic acid contained in the acid-treated seaweed. However, it will be apparent hereinafter that a higher proportion of the carboxyl groups may be neutralized prior to esterification of the remaining groups. The neutralized portion may thereafter be partially or completely reconverted to free acid by the addition of a mineral acid, such as hydrochloric, sulfuric, nitric or phosphoric acid, to the extracted solution of the resulting esterified product.

Alternately, in the case of a product having a low proportion of the carboxyl groups neutralized prior to the esterification reaction, further neutralization of the unreacted acidity may be accomplished after the esterification reaction by addition of an aqueous slurry or solution of a suitable alkaline substance to the aqueous extract of the product. Thus, in the procedure of the present invention, far greater flexibility in process conditions is possible in comparison with prior art conditions. Prior art methods of preparing glycol alginates are such that any attempt to reduce the uncombined acidity of the product by addition of alkali, is likely to result in some hydrolysis of the ester unless carried out in a manner which would cause considerable inconvenience to the manufacturer. This might involve forming a solution, or slurry of the partially dry product in water, low-boiling alcohol, or ketone, followed, after neutralization, by removal of the solvent in any suitable manner.

Alkaline agents suitable for the partial neutralization of the unextracted alginic acid, prior to or after the esterification reactions, are selected from the alkaline salts or hydroxides of cations known to produce water soluble alginate salts, the more common of which are sodium, potassium, ammonium, and magnesium. The alkaline salts or hydroxides of these cations may be used either singly or in combination with each other, or with other nontoxic salts or hydroxides of other cations, such as, for example, calcium. In general the selection is based on cost considerations in which case the preferred salts or hydroxides will be those of sodium, such as, for example, sodium carbonate, bicarbonate and hydroxide, or trisodium phosphate.

Also, it has been discovered that the addition of a salt of a strong base and a weak acid to the acid treated seaweed, during the partial neutralization process, will favour the subsequent esterification reaction (see Example 4) apparently by acting as a buffer, thus raising the pH of the reaction mixture and reducing hydrolysis of the alkylene oxide and the ester. An example of a suitable buffering agent which has been found effective in this respect is sodium tetraborate (borax). However, toxicity may preclude its use in preparing products intended for foods.

The acid treated, water washed and partially neutralized wet seaweed, prepared in the manner disclosed, may now be reacted with the alkylene oxide to produce the desired glycol alginate. However, due to the high water content and low pH of the acid treated seaweed, considerable hydrolysis of the oxide will occur and it is therefore desirable to reduce the water content somewhat, as by drying, to provide ideal conditions for the reaction (a water content of about 13 to about 40% by weight based on the weight of the treated seaweed which is to be esterified with alkylene oxide). During the drying process, which may be carried out by any convenient conventional method, it may be advantageous to grind the seaweed. While it is more convenient to carry out the acid and wash treatments using whole, or only partially comminuted sea plants to facilitate draining of the various solutions with which the plants are treated, the dry, treated seaweed is rather bulky and would occupy an excessive reactor volume. In the case of extracted alginic acid, apparently prior workers have thought it to be advantageous to grind the acid to a fluffy powder so as to expose the maximum surface area to the alkylene oxide and thus facilitate the esterification reaction. In the case of the unextracted alginic acid of the present invention, this has not been found to be necessary, possibly due to the manner in which the alginic acid is dispersed within the seaweed structure. In Examples 1–7, the seaweed was ground to a particle size range of approximately 5 to about 60 mesh. While the particle size range varied somewhat from one experiment to another, there was no indication of any significant effect on the resulting degree of esterification.

The treated seaweed, prepared in the manner disclosed above, is treated with an alkylene oxide at a molar ratio of oxide: alginic acid of about 1:1 to about 3:1. This maximum quantity is usually sufficient to produce the maximum required degree of esterification of the alginic acid present in the seaweed. Among the numerous suitable alkylene oxides are ethylene oxide, 1,2-epoxypropane (propylene oxide), 1,3-epoxypropane, 1,2-epoxybutane, 2,3-epoxybutane, 1,2-epoxy-2-methylpropane and others mentioned in the prior art as being appropriate for the preparation of glycol alginates.

The esterification reaction may be carried out in any suitable reactor operated at atmospheric pressure, fitted with an agitator, and reflux condenser, or in a closed reactor operated at superatmospheric pressures. Completion of the esterification reaction is indicated by an end of refluxing of the oxide in the condenser in the former case or a reduction in pressure in the latter case. The total volume of alkylene oxide may be added at the start of the reaction. However, it has been found advantageous to add the oxide gradually or in several aliquots. While the temperature is not particularly critical, a reaction temperature of about 55°C has been found to produce optimum esterification results. At this temperature, the reaction is usually completed, after the last addition of oxide, in about 15 minutes to about 6 hours, depending on the degree of neutralization and water content of the alginic acid present in the treated seaweed.

After completion of the esterification reaction, the product is conveniently recovered as by adding water to the reaction mixture with agitation, and separating the seaweed residues from the viscous glycol alginate solution by any suitable process such as centrifugation or filtration. Instead of marketing the product as an aqueous solution, a dry product may be recovered therefrom by, for example, alcohol precipitation, or drum or spray drying. As stated earlier, the characteristics of the product may be adjusted during the extraction process by addition of dilute solutions of either an alkali or an acid. Thus, a glycol alginate product of low preneutralization, and having a low to medium degree of esterification, may have a poor water solubility and therefore not be readily extracted from the seaweed mass. In this case, addition of alkali will facilitate the extraction of the product due to greater solubility of the salt. The quantity added may be such as to completely neutralize the free acid present but under no circumstances should this quantity be exceeded due to the possibility of hydrolysis of the ester, and extraction from the seaweed residues of phenolic compounds which would color the product solution and the final product.

Either before or after separation of the seaweed residues, the pH of the extract solution may be modified by addition of a suitable acid. The quantity of acid added may be such as to acidify any portion of the neutralized carboxyl groups, and will depend on the characteristics desired in the glycol alginate product. Bleaching agents similar to those used for the production of sodium alginate, or alginic acid, may be added to the glycol alginate extract solution. It has been found, however, that the extract solutions prepared according to the process of the instant invention are relatively free from color bodies and do not require the use of bleaching agents. In contrast with this finding, Haug in U.S. Pat. No. 3,396,158 teaches that the usual brown coloration of sodium alginate extract solution is due to the presence of polymerized phenolic compounds which are rendered soluble, and thus extracted from the seaweed, as a result of the alkalinity of the seaweed mixture during alkaline extraction of the alginate content of the seaweed by prior art processes.

In the instant process for the extraction of glycol alginates, any addition of alkaline solutions to increase the solubility of the product, is carried out slowly, and with agitation of the aqueous mixture, so that the solution pH does not exceed that of neutrality. The use of an alkaline solution comprising sodium bicarbonate is preferred. Also, there is evidence that certain seaweed species are more likely to yield colored alginate extract solutions than other species. *Laminaria digitata* is low in phenolic compounds and thus gives light colored extracts, while the *Ascophyllum* species, such as *A. nodosum* or *A. nodosum var mackii* give dark brown colored extracts indicative of a high phenolic content.

The *L. digitata* seaweed gave very good esterification results as shown in Examples 6 and 7, while a sample of *A. nodosum var mackii* gave unexpectedly poor results as shown in Example 5, TABLE V. It is believed that this poor result was due to the high phenolic content. However, it has been discovered that a further treatment of the same acid treated and washed seaweed solids with a dilute aqueous formaldehyde solution, prior to neutralization, provided a marked improvement in the degree of esterification as shown in TABLE VI. This formaldehyde treatment may be applied to other seaweed species with advantage, the treatment time and the quantity and concentration of formaldehyde used being varied depending on the seaweed species involved. It is also contemplated that it will be advantageous in certain instances to employ sequentially both the formaldehyde treatment step and a buffering agent during a partial neutralization step as described earlier, prior to the esterification reaction.

A further feature of this present invention is that, if alcohol precipitation is employed as a means of recovering the glycol alginate product, any water soluble hydrolysis products of the oxide will probably remain in solution on addition of alcohol. Geller in U.S. Pat. No. 2,559,612 indicates that the present commercial glycol alginates, in particular propylene glycol alginate, are improved as foam stabilizing agents by extraction of the dry material with an organic solvent such as alcohol. Thus in the method of the present invention, when the product is not extracted as such with an alcohol, subsequent recovery of the product by alcohol precipitation may be expected to provide a similar result.

The following examples are illustrative and are not to be construed as limiting the present invention.

Examples

For purposes of valid comparison of variables affecting the esterification reactions in the detailed examples, a standard procedure was adopted to eliminate variables in the known acid treatment of the seaweed and associated washing steps as well as the analytical standards and methods relating to the various reactions in the present process. Thus in all examples, the same amount of hydrochloric acid only was employed, and only sodium bicarbonate was utilized in varying amounts to accomplish the specified percentage of partial neutralization when that optional but highly desirable intermediate step was employed. Also, a single alkylene oxide, propylene oxide, was employed in the esterification reaction to render the results of the various procedures comparable. Accordingly, these prescribed procedures are described in detail below, but mentioned only briefly in the enumerated examples. Unless otherwise stated herein, all temperatures are expressed in degrees Centigrade and all proportions in terms of weight.

An analysis of each seaweed sample used in the following examples was carried out to determine (a) the alginate content (as alginic acid) determined by the modified method of F. Saiz, *Invest. Pesq.*, 30, 541–60 (1966) and (b) the dry weight of a weighed quantity of the seaweed after an acid and water wash treatment.

The total amounts of free, esterified and neutralized carboxyl groups in the unextracted propylene glycol alginate were determined from a knowledge of (1) the original acid content determined in (a) above, (2) the weighed quantity of alkaline agent added before esterification to partially neutralize the alginic acid, and (3) the final unreacted acidity (determined by adding the reaction mixture after esterification to water and slowly titrating the stirred slurry to neutrality with a solution of sodium hydroxide of known normality). The percent esterification was determined by difference.

In all cases, the quantity of dry seaweed used was 100 g. This was acid treated for 1 hour using 2 liters of hydrochloric acid (2% HCl by weight), drained, then soaked twice in approximately 2 liters of fresh water for about 15 minutes. Any partial neutralization was carried out in a third wash by adding a further quantity of fresh water until the seaweed was completely covered, then with stirring using a spatula or glass rod, the calculated and weighed quantity of dry sodium bicarbonate was added and the mixture allowed to stand with occasional stirring for 15 minutes. The seaweed was then drained.

In order to dry and grind the wet treated seaweed samples, they were air or oven dried until damp-dry, then ground in a "Waring" blender after freezing with solid carbon dioxide to make the samples more brittle. The partially dry, ground samples were then either air or oven dried to a known water content determined from the weight of moisture-free treated seaweed (see (b) above), with allowance for the weight of any sodium bicarbonate added for partial neutralization.

The apparatus used for the esterification reactions consisted of a 500 ml reaction kettle fitted with stirrer and water-cooled and solid carbon dioxide cooled condensers to prevent loss of alkylene oxide. Heating was provided by means of a hot water bath. The propylene oxide was added by means of a burette. Refluxing of the oxide was observed to continue for a certain period of time after the last addition. The end of refluxing was a good indication of the reaction time, but as this varied somewhat, the reactions were carried out for periods of time in excess of the refluxing time.

The propylene glycol alginate products of the various examples were extracted from the esterification reaction product mixtures with water at room temperature in an amount sufficient to form solutions having alginate concentrations of the order of 2%. These solutions were separated from the remaining solid materials by filtering or centrifuging to recover the glycol alginate product in solution form. Also, a dry glycol alginate may be isolated by drying or alcohol precipitation as described above.

Example 1

This Example illustrates the effect of partial neutralization and of water content of the solid seaweed residue (acid treated and water washed seaweed) on the esterification reaction between unextracted alginic acid and propylene oxide.

Analysis of the selected batch of *Laminaria longicruris* showed an alginate content, expressed as alginic acid of 25.1 g per 100 g original seaweed. The weight of 100 g of this seaweed after acid treatment, water washing, and drying to constant weight according to the aforementioned standard procedure, was found to be 48.1 g.

The calculated quantity of propylene oxide required for a molar ratio of propylene oxide: alginic acid of 3:1 was 20.3 g. (24.3 ml). Thus, for each of the following reactions, 25 ml propylene oxide was used with oxide addition at the rate of 5 ml every 15 minutes. The reaction temperature was 65° and reaction time 5 hours, regardless of the refluxing time. Reactions were carried out using treated seaweed containing alginic acid, the carboxyl groups of which were preneutralized before esterification at the following levels (A) 0%, (B) 5%, (C) 10% and (D) 15%. The result of these experiments are shown in TABLE I, and illustrated graphically in FIG. 1 except for (A), the results of which were somewhat erratic.

oxide was added to the reactor at the rate of 2.5 ml per 15 minutes, 15% of the carboxyl groups of the unextracted alginic acid were neutralized prior to esterification, and the reaction temperature was varied between 45° and 60°. The results obtained are shown in TABLE II.

TABLE I

| (A) | (No preneutralization) | | | | | |
|---|---|---|---|---|---|---|
| | Weight of seaweed reacted (g) | 56.1 | 59.6 | 63.6 | 71.7 | 78.7 |
| | Water content of seaweed (g) | 8.0 | 11.5 | 15.5 | 23.6 | 30.6 |
| | Water content of seaweed % | 14.3 | 19.2 | 24.4 | 32.9 | 39.2 |
| | Free acidity % | 25.0 | 32.0 | 29.8 | 45.2 | 41.0 |
| | Esterification % | 75.0 | 68.0 | 70.2 | 54.8 | 59.0 |
| (B) | (5% neutralization) | | | | | |
| | Weight of seaweed reacted (g) | 48.2 | 54.1 | 60.5 | 68.8 | 80.4 | 109.8 |
| | Water content of seaweed (g) | — | 5.9 | 12.3 | 20.6 | 32.2 | 61.6 |
| | Water content of seaweed % | — | 10.9 | 20.3 | 29.9 | 40.0 | 56.1 |
| | Free acidity % | 69.7 | 22.7 | 20.1 | 21.4 | 35.5 | 52.6 |
| | Esterification % | 25.3 | 72.3 | 74.9 | 73.6 | 59.5 | 42.4 |
| (C) | (10% neutralization) | | | | | | |
| | Weight of seaweed reacted (g) | 54.8 | 61.5 | 69.8 | 86.5 | 111.3 |
| | Water content of seaweed (g) | 6.4 | 13.1 | 21.4 | 38.1 | 62.9 |
| | Water content of seaweed % | 11.7 | 21.3 | 30.6 | 44.0 | 56.5 |
| | Free acidity % | 9.8 | 1.1 | 1.6 | 9.1 | 24.8 |
| | Esterification % | 80.2 | 88.9 | 88.4 | 80.9 | 65.2 |
| (D) | (15% neutralization) | | | | | |
| | Weight of seaweed reacted (g) | 89.0 | 113.4 |
| | Water content of seaweed (g) | 40.6 | 65.0 |
| | Water content of seaweed % | 45.6 | 57.3 |
| | Free acidity % | 2.1 | 8.4 |
| | Esterification % | 82.9 | 76.6 |

Examination of the data which appear in TABLE I (A-D) and are illustrated in FIG. 1 clearly shows the relation between the water content and the percentage neutralization of the carboxyl groups of the unextracted alginic acid as they affect the esterification reaction with propylene oxide.

Under certain conditions for example, 10% neutralization and approximately 13 to 39% moisture content in the seaweed as shown in FIG. 1 an extremely high percentage of the carboxyl groups of the acid were esterified; whereas Steiner in TABLE 5 of U.S. Pat. No. 2,494,911 used an oxide : acid ratio of 3:1 and 15% neutralization to obtain 82 and 83% esterification after 7 and 22 hours reaction times respectively. This shows that unextracted alginic acid may be esterified as readily, and perhaps more readily, than the alginic acid of commercial purity. Although a standard reaction time of 5 hours was employed, in most cases there was no observable refluxing of the oxide after about 5 to 15 minutes after the last oxide addition except in the three cases where the seaweed contained less than 12.7% moisture. In these cases, unreacted oxide was still present at the end of the 5-hour reaction.

Example 2

This Example illustrates that satisfactory esterification results may be obtained using half the quantity of propylene oxide, (i.e. 12.5 ml, a molar ratio of oxide : alginic acid of 1.5:1) and the same seaweed sample, acid treatment and washing as used in Example 1. The

TABLE II

| Weight of seaweed reacted (g) | 62.4 | 62.4 | 62.4 | 62.4 |
|---|---|---|---|---|
| Water content of seaweed (g) | 14.0 | 14.0 | 14.0 | 14.0 |
| Water content of seaweed % | 22.4 | 22.4 | 22.4 | 22.4 |
| Reaction temperature °C | 45 | 50 | 55 | 60 |
| Time from addition of last aliquot of alkylene oxide to end of reflux (minutes) | About 30 | About 30 | About 30 | About 10 to 15 |
| Total reaction time (hours) | 3.5 | 3.5 | 2.5 | 2.25 |
| Free acidity % | 21.0 | 19.4 | 16.5 | 18.5 |
| Esterification % | 64.0 | 65.6 | 68.5 | 66.5 |

Examination of these data indicated that good esterification results were obtained with a relatively short reaction time. The optimum reaction temperature is seen to be about 55° but this is not critical.

Example 3

This Example illustrates that satisfactory esterification results may be obtained by the process of this present invention using reasonable amounts of alkylene oxide, and relatively short reaction periods.

A different *Laminaria longicruris* sample from that in Examples 1 and 2 was subjected to the prescribed acid treatment and washing. It had an analysis of 23.2 g alginic acid per 100 g original seaweed, and a dry treated seaweed weight of 47.6 g. The propylene oxide : alginic acid ratio was 2:1 using 13.5 g of oxide (16 ml added at the rate of 4 ml every 15 minutes). The reaction temperature was 55° and the stated percentages of the carboxyl groups of the unextracted alginic acid were neutralized prior to the esterification reaction. The results obtained, including the pH of the reaction mixture when added to water before the determination of the unreacted acidity, are shown in TABLE III, and the esterification results are also shown graphically in FIG. 2.

slurries became viscous during the addition of alkali in the determination of unreacted acidity. In such cases, therefore, it may be an advantage, for the recovery of products in good yield, to partially neutralize the unreacted acidity, separate the insoluble seaweed residues, then reacidify the extract solution to the required value.

Example 4

This Example illustrates a further feature of this pre-

TABLE III

| (A) | No. neutralization prior to esterification. | | | | | | |
|---|---|---|---|---|---|---|---|
| | Weight of seaweed reacted (g) | 52.6 | 56.1 | 60.9 | 66.1 | 71.0 | 78.6 |
| | Water content of seaweed (g) | 5.0 | 8.5 | 13.3 | 18.5 | 23.4 | 31.0 |
| | Water content of seaweed % | 9.5 | 15.1 | 21.8 | 27.9 | 32.9 | 39.4 |
| | Time to end of reflux (minutes) | **7.5 | 15–30 | 10–15 | 10–15 | 10–15 | * |
| | Total reaction time (hours) | 8.5 | 4 | 4 | 4 | 4 | 4 |
| | pH of reaction mixture | 3.6 | 3.6 | 3.6 | 3.5 | 3.4 | 3.6 |
| | Free acidity % | 58.0 | 35.2 | 37.5 | 40.3 | 45.5 | 61.7 |
| | Esterification % | 37.0 | 59.8 | 57.5 | 54.7 | 49.5 | 33.3 |
| | *virtually no reflux **=hours | | | | | | |
| (B) | 10% neutralized prior to esterification. | | | | | | |
| | Weight of seaweed reacted (g) | 54.0 | 55.5 | 58.0 | 61.4 | 66.5 | 74.7 |
| | Water content of seaweed (g) | 6.1 | 7.6 | 10.1 | 13.5 | 18.6 | 26.8 |
| | Water content of seaweed % | 11.3 | 13.7 | 17.4 | 22.0 | 28.0 | 35.9 |
| | Time to end of reflux (minutes) | 3.5* | 3.25* | 20 | 5–10 | 10 | 5–10 |
| | Total reaction time (hours) | 6 | 5 | 4 | 4 | 4 | 4 |
| | pH of reaction mixture | 3.7 | 3.7 | 3.7 | 3.7 | 3.7 | 3.7 |
| | Free acidity % | 42.1 | 38.4 | 33.8 | 34.7 | 39.8 | 45.9 |
| | Esterification % | 47.9 | 51.6 | 56.2 | 55.3 | 50.2 | 44.1 |
| | *=hours. | | | | | | |
| (C) | 15% neutralized prior to esterification | | | | | | |
| | Weight of seaweed reacted (g) | 55.8 | 58.4 | 61.4 | 64.5 | 67.6 | 72.5 |
| | Water content of seaweed (g) | 7.8 | 10.4 | 13.4 | 16.5 | 19.6 | 24.5 |
| | Water content of seaweed % | 14.0 | 17.8 | 21.8 | 25.6 | 29.0 | 33.8 |
| | Time to end of reflux (minutes) | >7* | 60 | 15 | 15 | 10 | 10 |
| | Total reaction time (hours) | 7 | 4 | 4 | 4 | 4 | 4 |
| | pH of reaction mixture | 4.0 | 4.0 | 4.0 | 4.1 | 3.9 | 3.9 |
| | Free acidity % | 32.0 | 21.3 | 19.8 | 20.4 | 24.5 | 28.2 |
| | Esterification % | 53.0 | 63.7 | 65.2 | 64.6 | 60.5 | 56.8 |
| | *=hours | | | | | | |
| (D) | 20% neutralized before esterification | | | | | | |
| | Weight of seaweed reacted (g) | 57.6 | 60.6 | 63.1 | 66.6 | 70.1 | 75.6 |
| | Water content of seaweed (g) | 9.5 | 12.5 | 15.0 | 18.5 | 22.0 | 27.5 |
| | Water content of seaweed % | 16.5 | 20.6 | 23.8 | 27.8 | 31.4 | 36.4 |
| | Time to end of reflux (minutes) | 90 | 30 | 20 | 15 | 10–15 | 10–15 |
| | Total reaction time (hours) | 5 | 5 | 4 | 4 | 4 | 4 |
| | pH of reaction mixture | 4.2 | 4.3 | 4.2 | 4.1 | 4.1 | 4.1 |
| | Free acidity % | 15.3 | 11.6 | 12.5 | 12.0 | 15.8 | 19.5 |
| | Esterification % | 64.7 | 68.4 | 67.5 | 68.0 | 65.2 | 60.5 |

Figure 2:
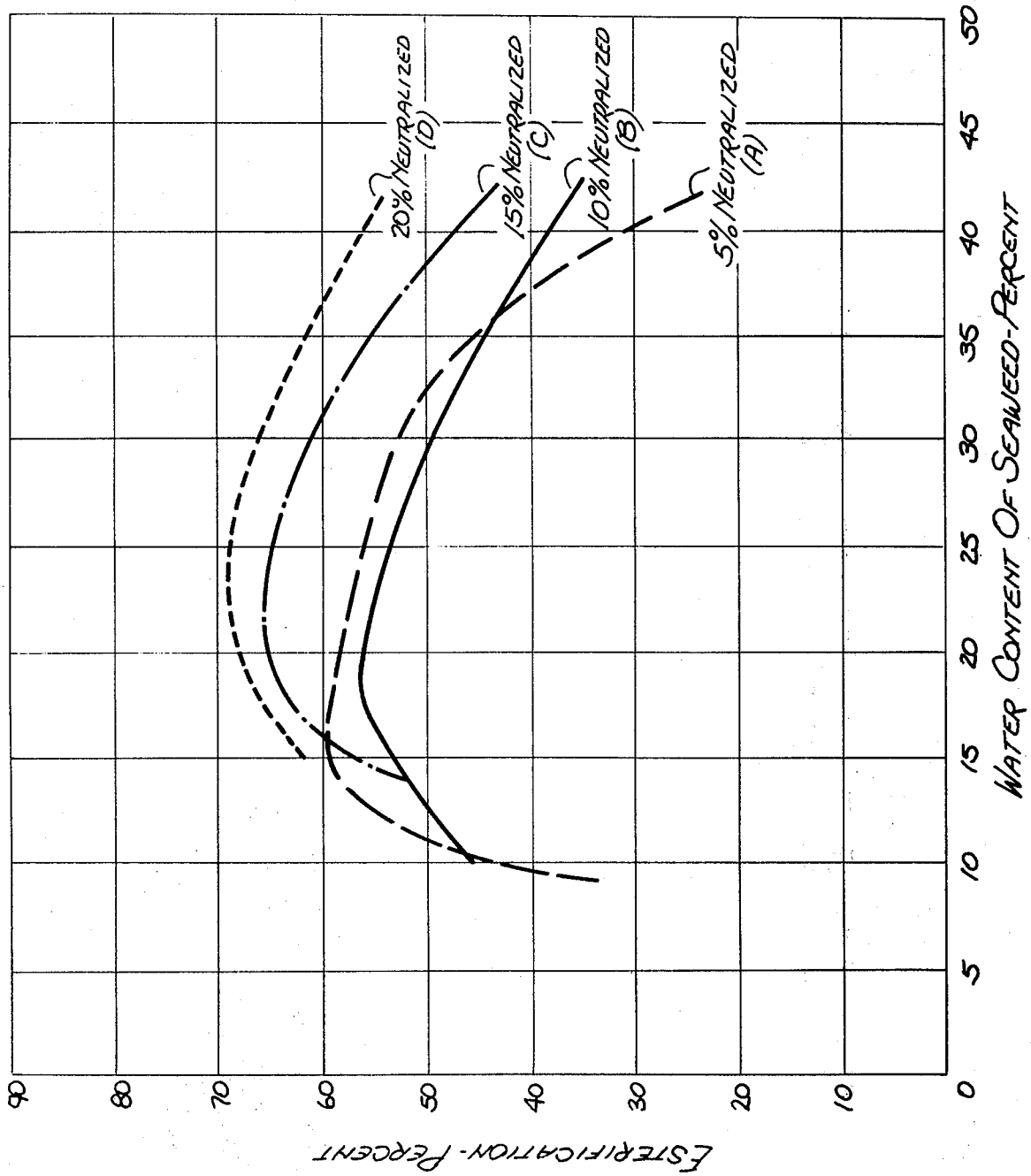

An examination of the data in TABLE III and especially FIG. 2 reveals that satisfactory degrees of esterification were obtained, particularly at a water content in the seaweed of approximately 17 to 35%. On addition to water, the more highly esterified reaction products gave viscous solutions indicating good product solubility. However, the products having substantially lower degrees of esterification were not as soluble, but the sent invention in that the addition of a buffer to the seaweed residue before the esterification reaction will tend to reduce hydrolysis of the alkylene oxide thus promoting the esterification reaction.

The seaweed was obtained from the same sample of *Laminaria longicruris* as was used in Example 3, and it was subjected to the acid treatment and water washing. A buffering agent, sodium borate ($Na_2B_4O_7.10H_2O$) (1 g) was added during the preneutralization stage to each of the treated seaweed samples. The experiments, the results of which are shown in TABLE IV, were carried out with the treated seaweed 5 and 15% preneutralized before esterification. Propylene oxide used was 16 ml and the reaction temperature was 55°, as in Example 3.

TABLE IV

| % of carboxyl groups preneutralized | 5 | 15 |
|---|---|---|
| Weight of seaweed reacted (g) | 57.7 | 63.5 |
| Water content of seaweed (g) | 10.0 | 15.5 |
| Water content of seaweed % | 17.3 | 24.4 |
| Time to end of reflux (minutes) | 15-20 | 20 |
| Total reaction time (hours) | 4 | 4 |
| pH of reaction mixture | 4.3 | 4.7 |
| Free acidity % | 21.3 | 7.9 |
| Esterification % | 73.7 | 77.1 |

The results illustrated in TABLE IV may be compared with those shown in TABLE III (A) and (C) and depicted in FIG. 2. Thus, for a 5% neutralization and a water content of 17.3%, the expected percent esterification of the product would be approximately 60%; but by using the buffering agent, an improvement of 13.7% was obtained. Similarly comparing the result obtained at a preneutralization level of 15% and water content of 24.4%, the improvement was approximately 12%.

Example 5

The analysis of a sample of *Ascophyllum nodosum var mackii* revealed an alginate content, expressed as alginic acid, of 43.0%. The moisture-free weight of 100 g of seaweed after acid treatment, water washing, and neutralization of 15% of the carboxyl groups of the alginic acid, was found to be 71.5 g.

Using a molar ratio of propylene oxide : alginic acid of 2:1 and 15% preneutralization of the carboxyl groups, esterification reactions were carried out in essentially the same manner as in Example 3 for the *Laminaria longicruris* seaweed. The results obtained and shown in TABLE V were below expectations, particularly in respect of the low degree of esterification of the products. These low esterifications were attributed to a high content of phenolic material in this species of seaweed.

Another sample of the same acid treated and water washed seaweed was immersed overnight in a dilute solution of 10 ml of 37% aqueous formaldehyde in 2 liters of water at room temperature. The solution was removed and the solid residue thoroughly washed with water prior to preneutralization. Then an esterification reaction, the results of which appear in TABLE VI, was carried out with the formaldehyde-treated seaweed residue in the same manner as for those which appear in TABLE V.

TABLE V (No formaldehyde treatment)

| Weight of seaweed reacted (g) | 93.0 | 98.0 | 106.0 | 120.4 |
|---|---|---|---|---|
| Water content of seaweed (g) | 21.5 | 26.5 | 34.5 | 48.9 |
| Water content of seaweed % | 23.1 | 27.0 | 32.5 | 40.6 |
| Time to end of reflux (minutes) | 15 | 5-10 | 5-10 | * |
| Total reaction time (hours) | 4 | 4 | 4 | 4 |
| pH of reaction product | 3.5 | 3.8 | 3.5 | 3.5 |
| Free acidity % | 57.0 | 59.5 | 63.5 | 58.2 |
| Esterification % | 28.0 | 25.5 | 21.5 | 26.8 |

*virtually no reflux.

TABLE VI (Formaldehyde treatment)

| Weight of seaweed reacted (g) | 98.7 |
|---|---|
| Water content of seaweed (g) | 27.2 |
| Water content of seaweed % | 27.5 |
| Time to end of reflux (minutes) | 10 |
| Total reaction time (hours) | 4 |
| pH of reaction product | 3.2 |
| Free acidity % | 36.0 |
| Esterification % | 49.0 |

The results in TABLE VI show a significant improvement in esterification as a result of the formaldehyde treatment compared with the data in TABLE V. Moreover, there is reason to believe that still greater increases in esterification could be obtained by increasing the quantity of formaldehyde charged or by sequentially using both the formaldehyde treatment and a buffering agent such as that used in Example 4.

Example 6

This Example demonstrates that the present process may be applied to seaweed species other than those used in the preceding Examples. The seaweeds used were *Laminaria digitata* (24.3% alginate content expressed as alginic acid, and a moisture-free weight of treated seaweed, 47.6 g) and *Alaria esculenta* (the analysis of which showed 29.9% alginic acid content and the moisture-free weight of treated seaweed, 55.6 g).

The reaction conditions for the seaweed residue (after acid treating, washing and 15% preneutralization) were an esterification reaction temperature of 55° and an oxide : acid ratio of 2:1. The results obtained are shown in the following table.

TABLE VII

| Seaweed species | *Laminaria digitata* | | *Alaria esculenta* | |
|---|---|---|---|---|
| Weight of seaweed reacted (g) | 66.5 | 77.8 | 77.5 | 84.2 |
| Water content of seaweed (g) | 18.9 | 30.2 | 21.9 | 28.6 |
| Water content of seaweed % | 28.4 | 38.8 | 28.2 | 34.0 |
| Time to end of reflux (Minutes) | 5* | 5-10 | 10-15 | 10-15 |
| Total reaction time (hours) | 6 | 4 | 4 | 4 |
| pH of product | 4.8 | 3.8 | 4.3 | 4.1 |
| Free acidity % | 5.3 | 15.5 | 14.0 | 22.0 |
| Esterification % | 79.7 | 69.5 | 71.0 | 63.0 |

*=hours

The results which appear in TABLE VII were extremely satisfactory considering the small proportion of alkylene oxide used. With the use of a buffering agent, it is possible that virtually complete esterification of the free carboxyl groups could be achieved under the same reaction conditions. The seaweed residues were separated from the aqueous slurries, after determination of free acidity, by filtration; this provided almost colorless solutions which on alcohol precipitation and drying gave white propylene glycol alginate products in good yield.

Example 7

This Example illustrates that, by the process of this present invention, an extremely high level of esterification of unisolated alginic acid derived from seaweeds of the Class Phaeophyceae, may be achieved without excessive use of alkylene oxide and in relatively short reaction times.

The seaweed residue used was acid treated and washed *Laminaria digitata* with 5% preneutralization of the carboxyl groups of the unextracted alginic acid. The esterification temperature was 55°, and the propylene oxide : alginic acid ratio was 3:1. The results obtained are shown in TABLE VIII.

TABLE VIII

| | |
|---|---|
| Weight of seaweed reacted (g) | 66.0 |
| Water content of seaweed (g) | 18.4 |
| Water content of seaweed % | 27.9 |
| Time to end of reflux (minutes) | 90 |
| Total reaction time (hours) | 4 |
| pH of product | 3.8 |
| Free acidity % | 8.0 |
| Esterification % | 87.0 |

While this esterification result is considered very good, it is probable that the result obtained might be improved by the use of other optional features disclosed herein and which may be incorporated in the present invention, for example, by the addition of a buffering agent, a slightly higher preneutralization percentage, or by an adjustment in the water content of the seaweed.

GENERAL

As used herein, all figures for moisture or water content of seaweed are expressed as percentages (by weight) of the sample taken which includes the dry weight of seaweed plus moisture or water contained therein.

While the preferred limits for moisture content of the seaweed subjected to reaction with the alkylene oxide are from 13 to 40%, the moisture content can range from substantially zero to as high as 57% or even higher.

The molar ratio of alkylene oxide to alginic acid content of the seaweed in the esterification can vary anywhere from 1:1 upwards. The upper limit is determined by considerations of cost of alkylene oxide and optimum productivity of equipment. It will be obvious that an excess of alkylene oxide over that required to obtain the desired result would not be used. As indicated above, a molar ratio between about 1:1 and 3:1 is preferred in practice.

The temperature used in the esterification step can vary depending on various factors especially the water content of the seaweed used in that step. Thus, the temperature could, with possible advantage, be raised for low water content and reduced where water content is high, on the assumptions (1) that with increasing temperature the rate of undesired hydrolysis of alkylene oxide increases and (2) that with decreasing temperature the decrease in the rate of such hydrolysis is proportionately greater than the decrease in rate of esterification of alginic acid with alkylene oxide.

The following comments relate to the recovery of the alkylene glycol alginate product from the esterification reaction mixture by water extraction. The water solubility of products having a low degree of preneutralization and esterification is slight, thus yields would be low unless appropriate measures are taken. The yields can be improved in such cases by adding a suitable alkaline substance, especially an alkaline salt or hydroxide of a cation selected from the group consisting of sodium, potassium, ammonium and magnesium, for example sodium bicarbonate, to the extraction slurry resulting from mixing water with the esterification reaction mixture to at least partially reduce the unreacted acidity of the alkylene glycol alginate product and thus increase the solubility of the product, separating the extract solution of the alkylene glycol alginate product from the insoluble seaweed residues, and after such separation reacidifying the alkylene glycol alginate to any desired value by adding a suitable strong acid, especially one selected from the group consisting of hydrochloric, sulfuric, phosphoric and nitric acids, to the separated extract solution.

The yields achieved by the practice of the invention consistently run from 80 to 85% of alkylene glycol alginate based on the alginic acid content of the original seaweed. It is believed that such yields are better, and possibly significantly better, than the yields obtained by prior art workers (which yields are not always clearly indicated by such workers) because the practice of the invention eliminates the alginic acid loss incident to isolation thereof from the seaweed in preparation for the esterification step.

While the process of this invention has been described in detail in respect to a limited number of embodiments employing the same reactants for purposes of complete disclosure and for valid comparison, it will be apparent to those skilled in the art that many other modifications and variations are within the purview of this invention, especially in regard to other reactants, treating agents and reaction conditions. Accordingly, this invention should not be construed as limited in any particulars except as may be recited in the appended claims or required by the prior art.

I claim:

1. A process of making alkylene glycol alginates from a seaweed of the Class Phaeophyceae which comprises treating said seaweed with an aqueous solution of a strong acid, separating the acid treated seaweed from the aqueous acidic solution, washing the separated seaweed with water to remove residual treating acid and water soluble components therefrom, reacting the resulting treated seaweed with an alkylene oxide, and recovering alkylene glycol alginate from the resulting reaction mixture.

2. A process according to claim 1 in which said strong acid is a mineral acid.

3. A process according to claim 1 in which said strong acid is selected from the group consisting of hydrochloric, sulfuric, phosphoric and nitric acids.

4. A process according to claim 1 in which unextracted alginic acid is partially neutralized by treating said acid treated and washed seaweed with an alkaline substance prior to esterification with said alkylene oxide.

5. A process according to claim 4 in which said alkaline substance is sodium bicarbonate.

6. A process according to claim 4 in which between about 5 and 40% of the carboxyl groups in the unextracted alginic acid are neutralized.

7. A process according to claim 6 in which said alkaline substance is sodium bicarbonate.

8. A process according to claim 4 in which the partial neutralization is carried out in the presence of a buffering agent.

9. A process according to claim 8 in which said buffering agent is sodium tetraborate.

10. A process according to claim 1 in which the reaction with said alkylene oxide is carried out with said treated seaweed having a moisture content between about 13 and 40% by weight.

11. A process according to claim 1 which further comprises the step of treating said acid treated seaweed with an aqueous solution of formaldehyde after treatment with said strong acid and prior to the reaction with said alkylene oxide.

12. A process according to claim 11 in which unextracted alginic acid in the said acid and formaldehyde treated seaweed is partially neutralized by treating with an alkaline substance in the presence of a buffering agent prior to the reaction with the said alkylene oxide.

13. A process according to claim 1 in which said alkylene oxide is 1,2-epoxypropane.

14. A process according to claim 6 in which said strong acid is selected from the group consisting of hydrochloric, sulfuric, phosphoric and nitric acids, and the reaction with said alkylene oxide is carried out with said treated seaweed having a moisture content between about 13 and 40% by weight.

15. A process according to claim 14 in which the partial neutralization is carried out in the presence of a buffering agent.

16. A process according to claim 14 in which said acid treated seaweed is treated with an aqueous solution of formaldehyde prior to partial neutralization and subsequent reaction with said alkylene oxide.

17. A process according to claim 1 in which said step of reacting with an alkylene oxide is carried out at a temperature between about 45° and 65°C for a period of about 2 to 8 hours.

18. A process according to claim 1 in which the molar ratio of alkylene oxide to alginic acid content of the treated seaweed, employed in said step of reacting the latter with alkylene oxide, is between about 1:1 and 3:1.

19. A process of making alkylene glycol alginates from seaweed of the Class Phaeophyceae which comprises treating said seaweed with an aqueous solution of hydrochloric acid and thereby forming alginic acid in the treated seaweed, separating the acid treated seaweed from the aqueous acidic solution, washing the separated seaweed with water to remove substantially all residual treating acid and water soluble components therefrom, neutralizing between about 5 and 40% of the carboxyl groups in the unextracted alginic acid in the acid treated and water washed seaweed with sodium bicarbonate, reducing the moisture content of the acid treated, water washed, partially neutralized seaweed to between about 13 and about 40% by weight based on the weight of said acid treated, water washed, partially neutralized seaweed, reacting the alginic acid contained in the resulting seaweed in situ with an alkylene oxide at a temperature between about 45° and 65° C without separation or isolation of alginic acid from the seaweed, and recovering alkylene glycol alginate from the resulting reaction mixture.

20. A process according to claim 19 which further comprises the step of treating the acid treated, water washed seaweed with an aqueous solution of formaldehyde prior to said neutralizing step.

21. A process according to claim 1 in which the recovery of alkylene glycol alginate from said reaction mixture is carried out by mixing water with the reaction mixture to form a slurry, admixing an alkaline substance with the resulting slurry to at least partially reduce the unreacted acidity of the alkylene glycol alginate contained therein and increase the solubility of said alginate, separating the aqueous extract solution from the insoluble seaweed residues, and thereafter adding a strong acid to the extract solution to restore the level of unreacted acidity of said alginate to the desired value.

22. A process according to claim 21 in which said alkaline substance is selected from the group consisting of alkaline salts and hydroxides of the cations sodium, potassium, ammonium and magnesium.

23. A process according to claim 21 in which said alkaline substance is sodium bicarbonate.

24. A process according to claim 21 in which said strong acid is selected from the group consisting of hydrochloric, sulfuric, phosphoric and nitric acids.

* * * * *